US012719701B2

(12) United States Patent
Hu et al.

(10) Patent No.: US 12,719,701 B2
(45) Date of Patent: Aug. 25, 2026

(54) SINGLE SEAL UNIFIED MANAGEMENT AND UNIFIED HANDLING SYSTEM AND SINGLE SEAL UNIFIED MANAGEMENT AND UNIFIED HANDLING METHOD

(71) Applicant: Jinqian Hu, Hangzhou (CN)

(72) Inventors: Jinqian Hu, Hangzhou (CN); Ai Guo, Hangzhou (CN); Xinyi Cai, Hangzhou (CN)

( * ) Notice: Subject to any disclaimer, the term of this patent is extended or adjusted under 35 U.S.C. 154(b) by 50 days.

(21) Appl. No.: 18/967,628

(22) Filed: Dec. 3, 2024

(65) Prior Publication Data

US 2025/0184156 A1 Jun. 5, 2025

(30) Foreign Application Priority Data

Dec. 4, 2023 (CN) ........................ 202311642541.X

(51) Int. Cl.

*H04L 29/06* (2006.01)
*G06Q 50/26* (2012.01)
*H04L 9/32* (2006.01)

(52) U.S. Cl.

CPC ........... *H04L 9/3263* (2013.01); *G06Q 50/26* (2013.01)

(58) Field of Classification Search

CPC .................................................... H04L 9/3263

See application file for complete search history.

(56) References Cited

U.S. PATENT DOCUMENTS

2018/0173871 A1* 6/2018 Toth .................... H04W 12/126
2024/0080208 A1* 3/2024 Hu ........................... H04L 9/50

FOREIGN PATENT DOCUMENTS

WO WO-2018218465 A1 * 12/2018 ......... H04L 63/0823

* cited by examiner

*Primary Examiner* — Jason K Gee

(74) *Attorney, Agent, or Firm* — OPENPTO US LLC; Yuhao Liang

(57) ABSTRACT

A single seal unified management and unified handling system includes multiple branch information acquisition modules; a group information acquisition module; an information authentication module coupled to the multiple branch information acquisition modules and the group information acquisition module; a branch electronic seal generation module coupled to the information authentication module; a group electronic seal generation module coupled to the information authentication module; an unified management and unified handling seal generation module coupled to the branch electronic seal generation module and the group electronic seal generation module and configured to generate a group unified management and unified handling seal and multiple branch unified management and unified handling seals; an authorization module coupled to the unified management and unified handling seal generation module. Further disclosed is a single seal unified management and unified handling method. Subordinate seals of all levels are managed through a single unified management and unified handling seal.

4 Claims, 6 Drawing Sheets

FIG. 5

Provide a central control module, a communication module, an identity authentication module, a key module and a storage module, in which the communication module, the identity authentication module, the key module and the storage module are connected to the central control module

S610

Implement communication between the single seal unified management and unified handling system and an external server through the communication module

S620

Authenticate biometric data inputted by users to generate authenticated biometric data through the identity authentication module, and authorize the users after authentication

S630

Store multiple keys through the key module, and encrypt all information with corresponding keys

S640

Store all information and all seals through the storage module

S650

Receive input and control operation of other modules through the central control module, and allow the user to call the multiple branch unified management and unified handling seals, the group unified management and unified handling seal and subordinate seals thereof after authorization

SINGLE SEAL UNIFIED MANAGEMENT AND UNIFIED HANDLING SYSTEM AND SINGLE SEAL UNIFIED MANAGEMENT AND UNIFIED HANDLING METHOD

CROSS-REFERENCE TO RELATED APPLICATION

This application claims priority of Chinese Patent Application No. 202311642541.X, filed on Dec. 4, 2023, the entire contents of which are incorporated herein by reference.

FIELD OF THE INVENTION

The present invention relates to the technical field of information security, and specifically relates to a seal management method.

BACKGROUND OF THE INVENTION

Both corporate and government often need to a large number of contracts, bills, tax declarations and other affairs, and also need to manage different personal seals, common seals, and various business seals, and the process is very cumbersome. Therefore, it is urgent for those skilled in the art to develop digital certificate-union credit seal grid management system based on the application of electronic seals, to solve the problems of corporates and governments in the management and application of various electronic seals, and meet the actual needs of corporate and government in daily government applications.

It is to be noted that the above introduction of the technical background is only for the purpose of facilitating a clear and complete explanation of the technical solution of the present invention and facilitating the understanding of those skilled in the art. These solutions should not be considered to be known to those skilled in the art simply because they are described in the background art of the present invention.

SUMMARY OF THE INVENTION

In order to overcome the problems in the prior art, the embodiments of the present invention provide a single seal unified management and unified handling system and a single seal unified management and unified handling method.

The embodiments of the present invention discloses a single seal unified management and unified handling system, comprising: multiple branch information acquisition modules, a group information acquisition module, an information authentication module, a branch electronic seal generation module, a group electronic seal generation module, a unified management and unified handling seal generation module, and an authorization module. The multiple branch information acquisition modules are configured to acquire multiple first identity information and multiple branch corporate information of multiple branch users; the group information acquisition module is configured to acquire multiple second identity information and multiple group corporate information of a group user; the information authentication module is configured to carry out entity or digital authentication on the multiple first identity information, the multiple branch corporate information, the multiple second identity information and the multiple group corporate information so as to generate multiple authenticated first identity information and multiple authenticated branch corporate information of the multiple branch users and generate multiple authenticated second identity information and multiple authenticated group corporate information of the group user; the branch electronic seal generation module is configured to generate multiple branch electronic personal seals according to the multiple authenticated first identity information and generate multiple branch electronic common seals and multiple branch business seals of the multiple branch users according to the multiple authenticated first identity information and the multiple authenticated branch corporate information; the group electronic seal generation module is configured to generate a group electronic personal seal according to the multiple authenticated second identity information and generate a group electronic common seal and multiple group business seals of the group user according to the multiple authenticated second identity information and the multiple authenticated group corporate information; the unified management and unified handling seal generation module is configured to bind the group electronic personal seal, the group electronic common seal and the multiple group business seals of the group user, and the multiple branch electronic personal seals, the multiple branch electronic common seals and the multiple branch business seals of the multiple branch users, so as to generate a group unified management and unified handling seal and multiple branch unified management and unified handling seals; and the authorization module is configured to allow an authorization agent to call at least one of the group electronic personal seal, the group electronic common seal, the multiple group business seals, the multiple branch electronic personal seals, the multiple branch electronic common seals and the multiple branch business seals when calling at least one of the group unified management and unified handling seal and the multiple branch unified management and unified handling seals according to an authorized business range.

Further, the multiple branch unified management and unified handling seals are bound with the branch electronic personal seals, the branch electronic common seals and the multiple branch business seals of respective branch users respectively; and the multiple branch unified management and unified handling seals have the authority of calling the branch electronic personal seals, the branch electronic common seals and the multiple branch business seals of respective branch users.

Further, the group unified management and unified handling seal is bound with the group electronic personal seal, the group electronic common seal, the multiple group business seals, the multiple branch electronic personal seals, the multiple branch electronic common seals, the multiple branch business seals and the multiple branch unified management and unified handling seals; and the group unified management and unified handling seal has the authority of calling the group electronic personal seal, the group electronic common seal, the multiple group business seals, the multiple branch electronic personal seals, the multiple branch electronic common seals, the multiple branch business seals and the multiple branch unified management and unified handling seals.

Further, the single seal unified management and unified handling system further comprises a corporate account linking module is configured to link the multiple authenticated first identity information and the multiple authenticated branch corporate information with multiple branch corporate accounts of the multiple branch users respectively and generate multiple branch corporate account codes according to the multiple branch corporate accounts of the multiple branch users; and the corporate account linking module is further configured to link the multiple authenticated second identity information and the multiple authenticated group corporate information with a group corporate account of the group user, and generate a group corporate account code according to the group corporate account.

Further, the multiple branch corporate account code comprises email, contract number, bill number, payment account, statistical number, account number, tax declaration number, cloud account, video channel, live room ID, digital currency number, digital medical number and/or issuance number; and the group corporate account code comprises email, contract number, bill number, payment account, statistical number, account number, tax declaration number, cloud account, video channel, live room ID, digital currency number, digital medical number and/or issuance number.

Further, the multiple branch corporate account codes and the group corporate account code are bound with respective fixed telephone numbers, and the respective fixed telephone numbers are digital applications conforming to the global financial security level.

Further, the multiple branch business seals comprise an invoice seal, a seal of Finance Department and a contract seal; and the multiple group business seals comprise an invoice seal, a seal of Finance Department and a contract seal.

Further, the multiple branch corporate information comprises a bound telephone number, and a bound bank account, an electronic business license, tax control information, a common seal number, a legal person certificate number, a unified social credit code and/or an electronic license number of the multiple branch users authorized by a bank system and/or government system; and the multiple group corporate information comprises a bound telephone number, and a bound bank account, an electronic business license, tax control information, an common seal number, a legal person certificate number, a unified social credit code and/or an electronic license number of the group user authorized by a bank system and/or government system.

Further, the single seal unified management and unified handling system further comprises a multi-module. The multi-module comprises: a central control module, a communication module, an identity authentication module, a key module and a storage module, wherein the communication module, the identity authentication module, the key module and the storage module are connected to the central control module; the communication module is configured to implement communication between the single seal unified management and unified handling system and an external server; the identity authentication module is configured to authenticate biometric data inputted by the multiple branch users and/or group user to generate authenticated biometric data, and authorize the multiple branch users and/or group user after authentication; the key module is configured to store multiple keys, and encrypt the multiple authenticated first identity information, the multiple authenticated branch corporate information, the multiple authenticated second identity information and the multiple authenticated group corporate information according to corresponding keys in the multiple keys, so as to generate multiple encrypted authenticated first identity information, multiple encrypted authenticated branch corporate information, multiple encrypted authenticated second identity information and multiple encrypted authenticated group corporate information; the storage module is configured to store the authenticated biometric data, the multiple encrypted authenticated first identity information, the multiple encrypted authenticated branch corporate information, the multiple encrypted authenticated second identity information, the multiple encrypted authenticated group corporate information, the multiple branch electronic personal seals, the multiple branch electronic common seals, the multiple branch business seals, the multiple branch unified management and unified handling seals, the group electronic personal seal, the group electronic common seal, the multiple group business seals and the group unified management and unified handling seal; and the central control module is configured to receive input and control operation of other modules, and allow the multiple branch users and/or group user to call the multiple branch electronic personal seals, the multiple branch electronic common seals, the multiple branch business seals, the multiple branch unified management and unified handling seals, the group electronic personal seal, the group electronic common seal, the group business seal and the group unified management and unified handling seal after the multiple branch users and/or the group user are authorized.

The embodiments of the present invention further discloses a single seal unified management and unified handling method, comprising the following steps:

providing the single seal unified management and unified handling system, wherein the single seal unified management and unified handling system comprises multiple branch information acquisition modules, a group information acquisition module, an information authentication module, a branch electronic seal generation module, a group electronic seal generation module, an unified management and unified handling seal generation module and an authorization module; acquiring multiple first identity information and multiple branch corporate information of multiple branch users through the multiple branch information acquisition modules; acquiring multiple second identity information and multiple group corporate information of a group user through the group information acquisition module; carrying out entity or digital authentication on the multiple first identity information, the multiple branch corporate information, the multiple second identity information and the multiple group corporate information through the information authentication module so as to generate multiple authenticated first identity information and multiple authenticated branch corporate information of the multiple branch users and generate multiple authenticated second identity information and multiple authenticated group corporate information of the group user; generating multiple branch electronic personal seals according to the multiple authenticated first identity information through the branch electronic seal generation module, and generating multiple branch electronic common seals and multiple branch business seals of the multiple branch users according to the multiple authenticated first identity information and the multiple authenticated branch corporate information; generating a group electronic personal seal according to the multiple authenticated second identity information through the group electronic seal generation module, and generating a group electronic common seal and multiple group business seals of the group user according to the multiple authenticated second identity information and the multiple authenticated group corporate information; binding the group electronic personal seal, the group electronic common seal and the multiple group business seals of the group user, and the multiple branch electronic personal seals, the multiple branch electronic common seals and the multiple branch business seals of the multiple branch users through the unified management and unified handling seal generation module, so as to generate a group unified management and unified handling seal and multiple branch unified management and unified handling seals; and allowing an authorization agent to call at least one of the group electronic personal seal, the group electronic common seal, the multiple group business seals, the multiple branch electronic personal seals, the multiple branch electronic common seals and the multiple branch business seals through the authorization module when calling at least one of the group unified management and unified handling seal and the multiple branch unified management and unified handling seals according to an authorized business range.

By virtue of the technical solution, the present invention has the following beneficial effects: compared with the prior art, in the single seal unified management and unified handling system and the single seal unified management and unified handling method provided by the present invention, all subordinate seals can be called only through single seal unified management and unified handling seal, so that real digital certificate-union credit seal grid management of one-seal unified management and one-certificate unified handling is achieved, and it is safe, convenient and more reliable for the users. Then, after the elements are intensive, it can realize integrated credit reports such as one-click accounting, one-click assessment, one-click tax declaration, one-click statistics, one-click audit, one-click cancellation, one-click financing, and one-click listing. In addition, the present invention is not only suitable for multi-level units of groups and multiple branches, but also suitable for administrative units with different levels.

BRIEF DESCRIPTION OF THE DRAWINGS

FIG. 5 is a flowchart of a single seal unified management and unified handling method in one embodiment of the present invention.

FIG. 6 is a flowchart of a single seal unified management and unified handling method in another embodiment of the present invention.

Figure 1:
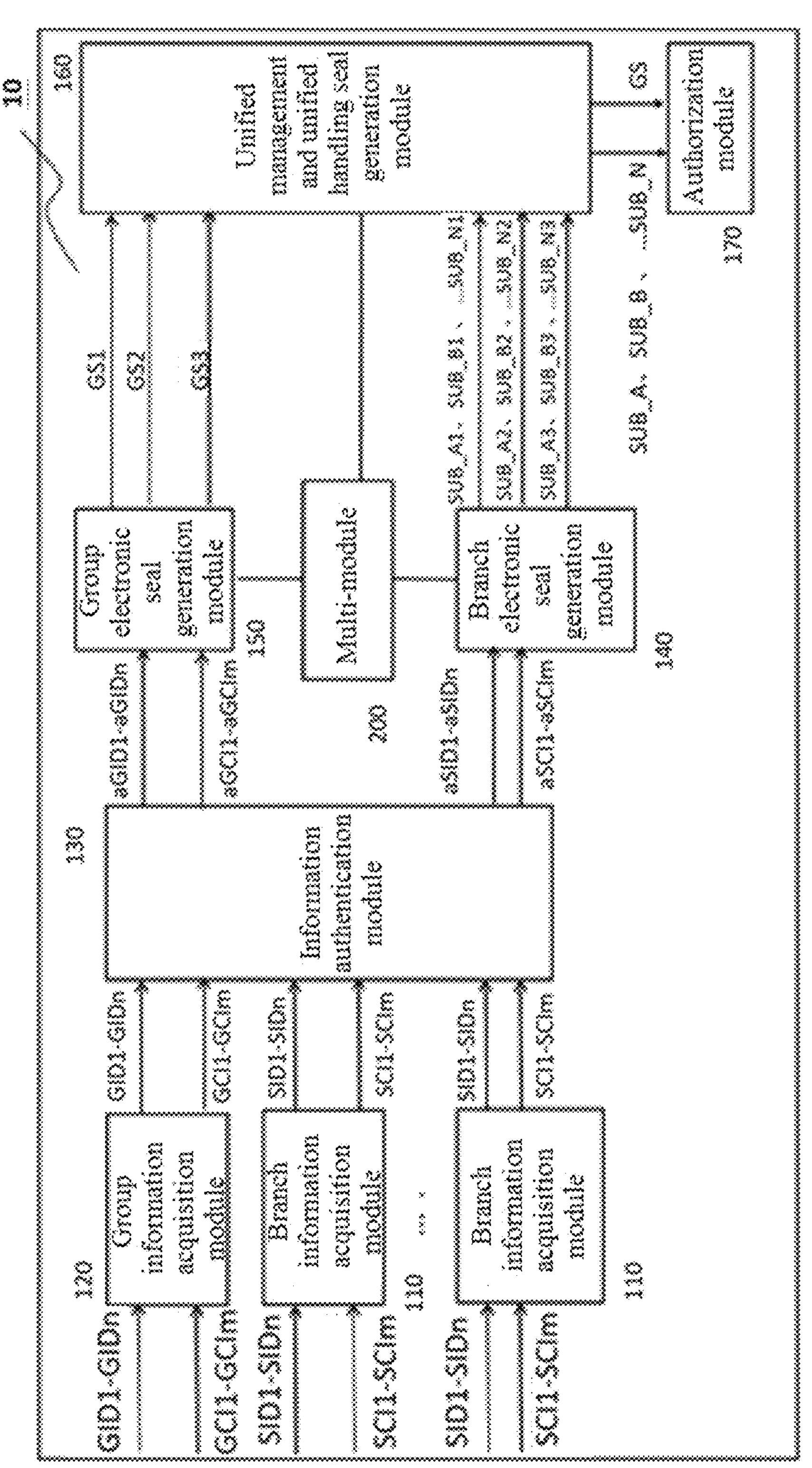
FIG. 1 is a frame diagram of a single seal unified management and unified handling system in one embodiment of the present invention.

Reference numerals in the above figures are as follows: 10, 10A—single seal unified management and unified handling system; 110—branch information acquisition module; 120—group information acquisition module; 130—information authentication module; 140—branch electronic seal generation module; 150—group electronic seal generation module; 160—unified management and unified handling seal generation module; 170—authorization module; 180—corporate account linking module; 200—multi-module; 210—central control module; 220—communication module; 230—identity authentication module; 240—key module; 250—storage module; SID1-SIDn, first identity information; aSID1-aSIDn, authenticated first identity information; SCI1-SCIm, branch corporate information; aSCI1-aSCIm, authenticated branch corporate information; GID1-GIDn, second identity information; aGID1-aGIDn, authenticated second identity information; GCI1-GCIm, group corporate information; aGCI1-aGCIm, authenticated group corporate information; SUB_A1, SUB_B1 . . . SUB_N1, branch electronic personal seal, SUB_A2, SUB_B2 . . . SUB_N2, branch electronic common seal; SUB_A3, SUB_B3 . . . SUB_N3, branch business seal, SUB_A, SUB_B . . . SUB_N, branch unified management and unified handling seal; GS1, group electronic personal seal; GS2, group electronic common seal; GS3, group business seal; GS, group unified management and unified handling seal, CN_A-CN_N, branch corporate account, CN_CodeA-CN_CodeN, branch corporate account code; CN_GS, group corporate account; CN_GS, group corporate account code; BID, biometric data; aBID, authenticated biometric data; KEY1-KEYq, key; eaSID1-aSIDn, encrypted first identity information; eaSCI1-eaSCIm, encrypted authenticated branch corporate information; eaGID1-eaGIDn, encrypted authenticated second identity information; eaGCI1-eaGCIm, encrypted authenticated group corporate information; S510-S660, S610-S580-step.

DETAILED DESCRIPTION OF SOME EMBODIMENTS

In order to make the above and other objective, features and advantages of the present invention more obvious and easy to understand, preferred embodiments are listed below and described in detail as follows in cooperation with accompanying drawings.

To describe the embodiments of the present invention or the technical solutions in the prior art more clearly, the following briefly introduces the accompanying drawings required for describing the embodiments or the descriptions in the prior art. Apparently, the accompanying drawings in the following description show merely some embodiments of the present invention, and a person of ordinary skill in the art may still derive other drawings from these accompanying drawings without creative efforts.

The technical solutions in the embodiments of the present invention will be clearly and completely described as follows in combination with the drawings in the examples of the present invention, but obviously, the described examples are only a part of the embodiments of the present invention, rather than all the embodiments. Based on the examples of the present invention, all other examples obtained by a person skilled in the art without creative efforts shall fall within the protection scope of the present invention It is to be noted that in the description of the present invention, the terms "first", "second", etc. are only used for describing the objective and distinguish similar objects, and there is no order between the two, nor can they be understood to indicate or imply relative importance. In addition, in the description of the present invention, unless otherwise stated, "multiple" means two or more of them.

With reference to FIG. 1, FIG. 1 is a frame diagram of a single seal unified management and unified handling system 10 in an Embodiment 1 of the present invention. As shown in FIG. 1, the single seal unified management and unified handling system 10 includes multiple branch information acquisition modules 110, a group information acquisition module 120, an information authentication module 130, a branch electronic seal generation module 140, a group electronic seal generation module 150, an unified management and unified handling seal generation module 160, and an authorization module 170.

In the embodiment, one group including N branches (branch A, branch B . . . branch B) is taken as an example for description, but it only serves as an example, the number of the branches is not limited.

The multiple branch information acquisition modules 110 are configured to acquire multiple first identity information SID1-SIDn and multiple branch corporate information SCI1-SCIm of multiple branch users. The group information acquisition module 120 is configured to acquire multiple second identity information GID1-GIDn and multiple group corporate information GCI1-GCIm of a group user. The information authentication module 130 is coupled to the multiple branch information acquisition modules 110 and the group information acquisition module 120, and is configured to carry out entity or digital authentication on the multiple first identity information SID1-SIDn, the multiple branch corporate information SCI1-SCIm, the multiple second identity information GID1-GIDn and the multiple group corporate information GCI1-GCIm so as to generate multiple authenticated first identity information aSID1-aSIDn and multiple authenticated branch corporate information aSCI1-aSCIm of the multiple branch users and generate multiple authenticated second identity information aGID1-aGIDn and multiple authenticated group corporate information aGCI1-aGCIm of the group user. The branch electronic seal generation module 140 is coupled to the information authentication module 130, and is configured to generate multiple branch electronic personal seals SUB_A1, SUB_B1 . . . SUB_N1 according to the multiple authenticated first identity information aSID1-aSIDn and generate multiple branch electronic common seals SUB_A2, SUB_B2 . . . SUB_N2 and multiple branch business seals SUB_A3, SUB_B3 . . . SUB_N3 of the multiple branch users according to the multiple authenticated first identity information aSID1-aSIDn and the multiple authenticated branch corporate information aSCI1-aSCIm. The group electronic seal generation module 150 is coupled to the information authentication module 130, and is configured to generate a group electronic personal seal GS1 according to the multiple authenticated second identity information aGID1-aGIDn and generate a group electronic common seal GS2 and multiple group business seals GS3 of the group user according to the multiple authenticated second identity information aGID1-aGIDn and the multiple authenticated group corporate information aGCI1-aGCIm. The unified management and unified handling seal generation module 160 is coupled to the branch electronic seal generation module 140 and the group electronic seal generation module 150, and is configured to bind the group electronic personal seal GS1, the group electronic common seal GS2 and the multiple group business seals GS3 of the group user, and the multiple branch electronic personal seals SUB_A1, SUB_B1 . . . SUB_N1, the multiple branch electronic common seals SUB_A2, SUB_B2 . . . SUB_N2 and the multiple branch business seals SUB_A3, SUB_B3 . . . SUB_N3 of the multiple branch users, so as to generate a group unified management and unified handling seal GS and multiple branch unified management and unified handling seals SUB_A, SUB_B . . . SUB_N. The authorization module 170 is coupled to the unified management and unified handling seal generation module 160, and is configured to allow an authorization agent to call at least one of the group electronic personal seal GS1, the group electronic common seal GS2, the multiple group business seals GS3, the multiple branch electronic personal seals SUB_A1, SUB_B1 . . . SUB_N1, the multiple branch electronic common seals SUB_A2, SUB_B2 . . . SUB_N2 and the multiple branch business seals SUB_A3, SUB_B3 . . . SUB_N3 when calling at least one of the group unified management and unified handling seal GS and the multiple branch unified management and unified handling seals SUB_A, SUB_B . . . SUB_N according to an authorized business range.

It is to be noted that the multiple first identity information SID1-SIDn may include ID card, bank account, address, email, telephone number, WeChat account, Alipay account, JD account, PDD account, MicroBlog account, QQ account, TikTok ID, live room ID and/or video channel of the company founder (i.e., the corporate administrator of each branch user); and the multiple second identity information GID1-GIDn can include ID card, bank account, address, email, telephone number, WeChat account, Alipay account, JD account, PDD account, MicroBlog account, QQ account, TikTok ID, live room ID and/or video channel of the group founder (i.e., the corporate administrator of each group user), but the present invention is not limited to this.

In one embodiment, after the information authentication module 130 finishes the entity or digital authentication on the multiple first identity information SID1-SIDn, the multiple branch corporate information SCI1-SCIm, the multiple second identity information GID1-GIDn and the multiple group corporate information GCI1-GCIm, a digital protocol will be transmitted to corresponding external servers, and then multiple authenticated first identity information aSID1-aSIDn, multiple authenticated branch corporate information aSCI1-aSCIm, multiple authenticated second identity information aGID1-aGIDn and multiple authenticated group corporate information aGCI1-aGCIm are generated.

Figure 2:
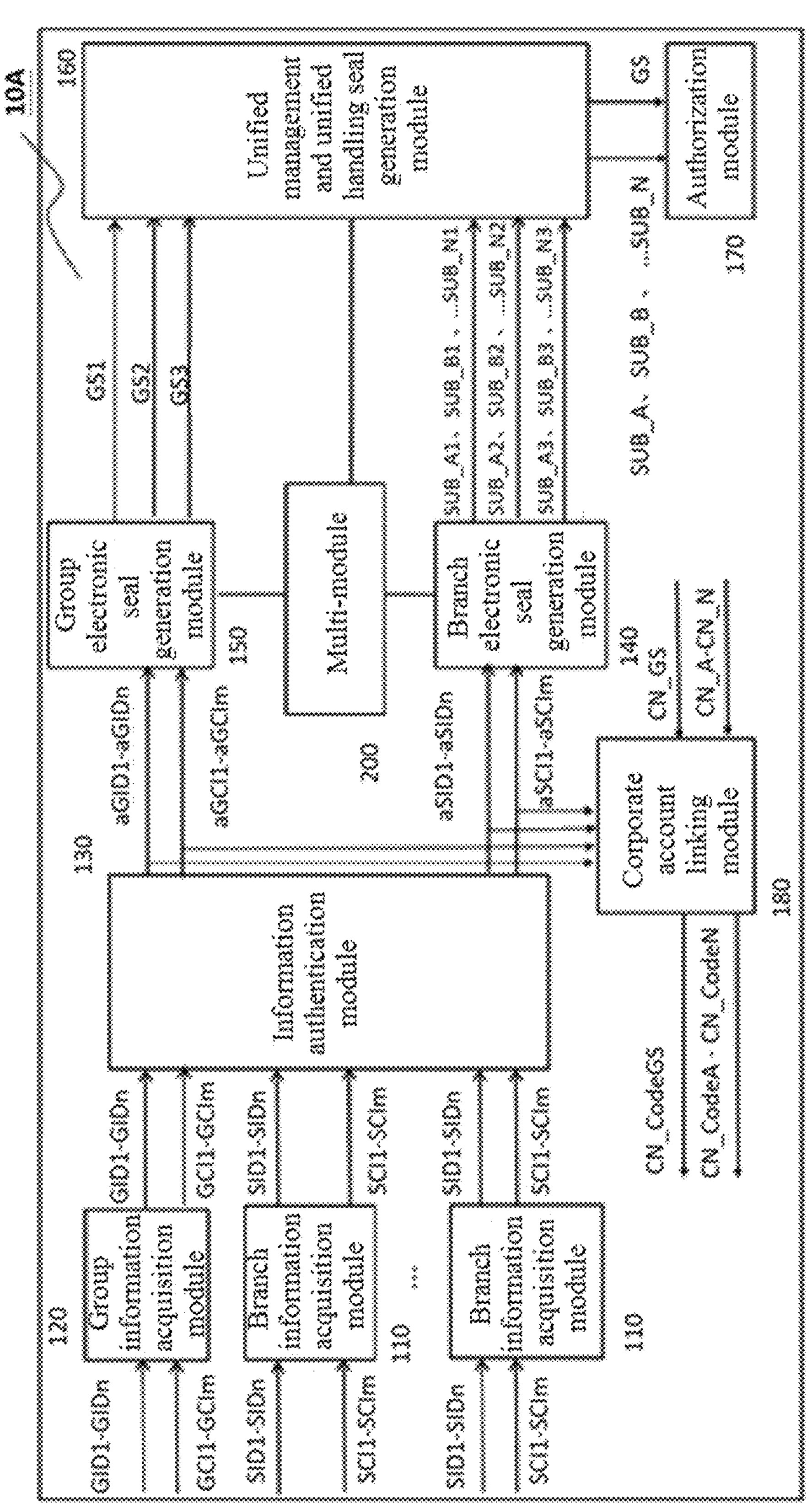
FIG. 2 is a frame diagram of a single seal unified management and unified handling system in another embodiment of the present invention.

With reference to FIG. 2, FIG. 2 is a frame diagram of a single seal unified management and unified handling system 10A in an Embodiment 2 of the present invention. The single seal unified management and unified handling system 10A in FIG. 2 is similar to the single seal unified management and unified handling system 10 in FIG. 1, and the difference is that the single seal unified management and unified handling system 10A in FIG. 2 further includes a corporate account linking module 180 which is coupled to the information authentication module 130 and configured to link the multiple authenticated first identity information aSID1-aSIDn and the multiple authenticated branch corporate information aSCI1-aSCIm with the multiple branch corporate accounts CN_A-CN_N of multiple branch users respectively and generate multiple branch corporate account codes CN_CodeA-CN_CodeN according to the multiple branch corporate accounts CN_A-CN_N of the multiple branch users; and the corporate account linking module 180 is further configured to link the multiple authenticated second identity information aGID1-aGIDn and the multiple authenticated group corporate information aGCI1-aGCIm with the group corporate account CN_GS of the group user and generate a group corporate account code CN_CodeGS according to the group corporate account CN_GS.

It is to be noted that the multiple branch corporate account code CN_CodeA-CN_CodeN may include telephone number, email, contract number, bill number, payment account, statistical number, account number, tax declaration number, cloud account, video channel, live room ID, digital currency number, digital medical number and/or issuance number, etc.; the group corporate account code CN_CodeGS may include telephone number, email, contract number, bill number, payment account, statistical number, account number, tax declaration number, cloud account, video channel, live room ID, digital currency number, digital medical number and/or issuance number, etc., but this is not a limitation of the present invention. After the elements are intensive, it can realize integrated credit reports such as one-click accounting, one-click assessment, one-click tax declaration, one-click statistics, one-click audit, one-click cancellation, one-click financing, and one-click listing.

Figure 3:
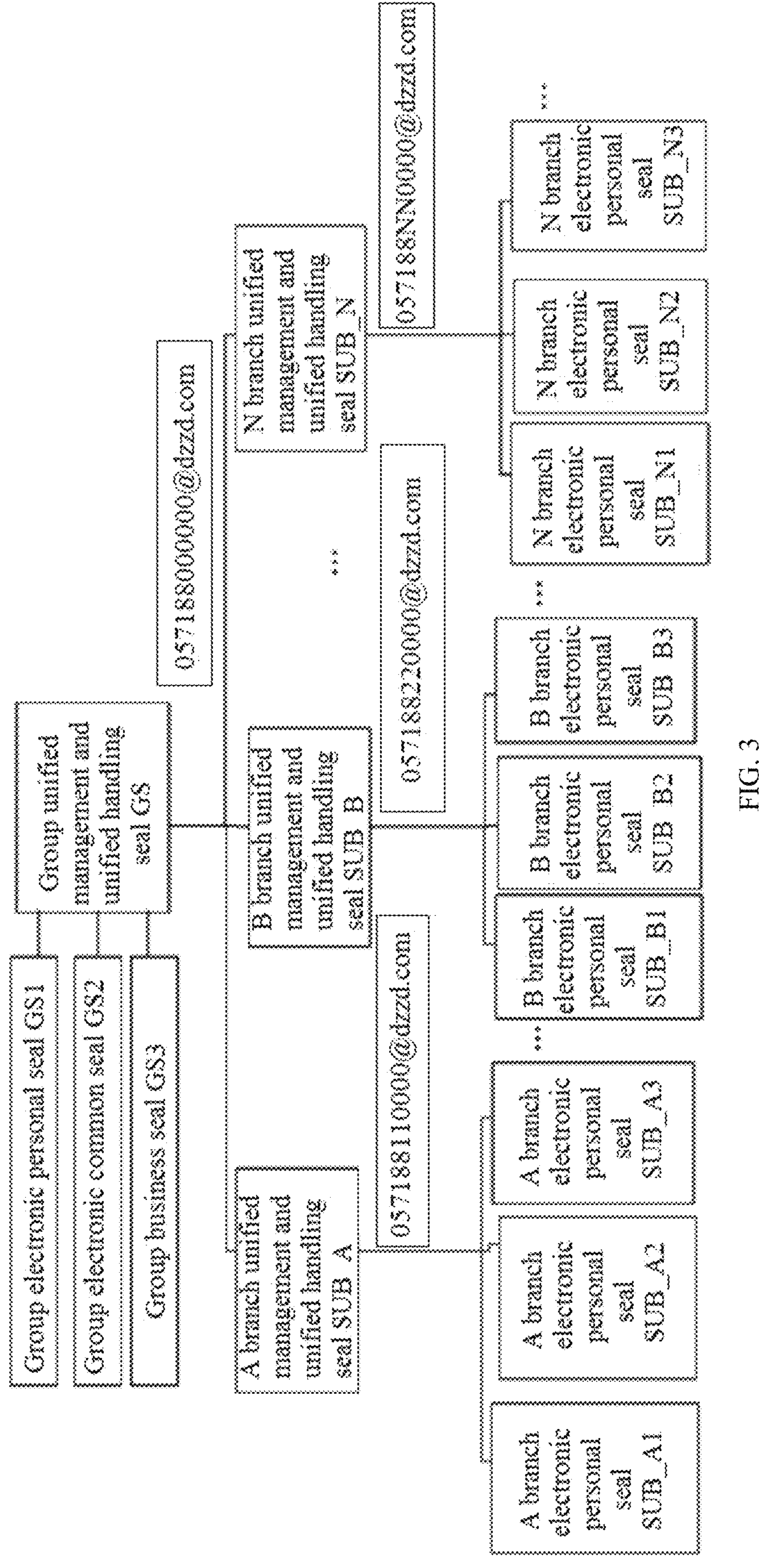
FIG. 3 is a schematic diagram of a structure of generating unified management and unified handling seals according to the present invention.

With reference to FIG. 3, FIG. 3 is a schematic diagram of a structure of generating unified management and unified handling seals according to the present invention. In the embodiment, the multiple branch unified management and unified handling seals SUB_A, SUB_B . . . SUB_N are respectively bound with the branch electronic personal seals SUB_A1, SUB_B1 . . . SUB_N1, the branch electronic common seals SUB_A2, SUB_B2 . . . SUB_N2 and the multiple branch business seals SUB_A3, SUB_B3 . . . SUB_N3 of respective branch users; and the multiple branch unified management and unified handling seals SUB_A, SUB_B . . . SUB_N have the authority of calling the branch electronic personal seals SUB_A1, SUB_B1 . . . SUB_N1, the branch electronic common seals SUB_A2, SUB_B2 . . . SUB_N2 and the multiple branch business seals SUB_A3, SUB_B3 . . . SUB_N3 of respective branch users. In other words, the A branch unified management seal SUB_A can call the branch electronic personal seal SUB_A1, the branch electronic common seal SUB_A2 and the branch business seal SUB_A3 of the A branch user; the B branch unified management seal SUB_B can call the branch electronic seal SUB_B1, the branch electronic common seal SUB_B2 and the branch business seal SUB_B3 of the B branch user; and so on, the N branch unified management seal SUB_N can call the branch electronic personal seal SUB_N1, the branch electronic common seal SUB_N2 and the branch business seal SUB_N3 of the N branch user. Therefore, all subordinate seals of respective branch users can be called only through single branch unified management seals SUB_A, SUB_B . . . SUB_N, so that the digital certificate-union credit seal grid management of one-seal unified management and one-certificate unified handling is really achieved, and it is safe, convenient and more reliable for the users.

It is also to be noted that the group unified management and unified handling seal GS is bound with the group electronic personal seal GS1, the group electronic common seal GS2, the multiple group business seals GS3, the multiple branch electronic personal seals SUB_A1, SUB_B1 . . . SUB_N1, the multiple branch electronic common seals SUB_A2, SUB_B2 . . . SUB_N2, the multiple branch business seals SUB_A3, SUB_B3 . . . SUB_N3 and the multiple branch unified management and unified handling seals SUB_A, SUB_B . . . SUB_N; and the group unified management and unified handling seal GS has the authority of calling the group electronic personal seal GS1, the group electronic common seal GS2, the multiple group business seals GS3, the multiple branch electronic personal seals SUB_A1, SUB_B1 . . . SUB_N1, the multiple branch electronic common seals SUB_A2, SUB_B2 . . . SUB_N2, the multiple branch business seals SUB_A3, SUB_B3 . . . SUB_N3 and the multiple branch unified management and unified handling seals SUB_A, SUB_B . . . SUB_N. In other words, the group unified management and unified handling seal GS can call own group electronic personal seal GS1, group electronic common seal GS2 and multiple group business seals GS3, and also has the authority of calling the branch unified management and unified handling seals SUB_A, SUB_B . . . SUB_N, so that all subordinate seals can be called, including the multiple branch electronic personal seals SUB_A1, SUB_B1 . . . SUB_N1, the multiple branch electronic common seals SUB_A2, SUB_B2 . . . SUB_N2, the multiple branch business seals SUB_A3, SUB_B3 . . . SUB_N3 and the multiple branch unified management seals SUB_A, SUB_B . . . SUB_N. Therefore, all subordinate seals can be called only through single seal unified management and unified handling seal GS, the digital certificate-union credit seal grid management of one-seal unified management and one-certificate unified handling is really achieved, and it is safe, convenient and more reliable for the users.

In the embodiment, the multiple branch corporate account code CN_CodeA-CN_CodeN and the multiple group corporate account code CN_CodeGS are respectively bound by respective fixed telephone numbers, and the respective fixed telephone numbers are digital applications conforming to the global financial security level. For example, if group corporate account code CN_CodeGS of a group is 057188000000, the email of the group is 057188000000@dzzd.com; if the branch corporate account code CN_CodeA of the branch A is 057188110000, the email of the branch A is 057188110000@dzzd.com; if the branch corporate account code CN_CodeB of the branch B is 057188220000, the email of the branch B is 057188220000@dzzd.com; if the branch corporate account code CN_CodeN of the branch N is 057188NN0000, the email of the branch N is 057188NN0000@dzzd.com; and they are all bound with the respective fixed telephone numbers.

It is to be noted that multiple branch business seals SUB_A3, SUB_B3 . . . SUB_N3 may include an invoice seal, a seal of Finance Department and a contract seal; and the multiple group business seals may include an invoice seal, a seal of Finance Department and a contract seal, but the present invention is not limited to this.

In the present embodiment, it is illustrated by taking the group and the multiple branches as an example, but this is only an example of the present invention, not a limitation of the present invention, and those with common knowledge in the art should understand that the present invention can also be applied to different levels of administrative departments, for example, a provincial-level administrative region can correspond to a group, and it has multiple municipal-level administrative districts corresponding to multiple subsidiaries, and multiple county-level administrative districts are established in each municipal-level administrative district and correspond to multiple sub-subsidiaries, and so on. In this way, a provincial-level unified management and unified handling seal of the provincial-level administrative region can call all the relative subordinate seals (including a municipal-level unified management and unified handling seal, a county-level unified management and unified handling seal, etc.); the county-level unified management and unified handling seal of the municipal-level administrative district can call all the county-level unified management and unified handling seals, the county-level unified management and unified handling seal of the county-level administrative district can call all the relative township-level unified management and unified handling seals, and the township-level unified management and unified handling seal of the township-level administrative region can call all the relative township-level electronic personal seals, township-level electronic common seals, and relative township-level business seal, thus achieving real digital certificate-union credit seal grid management of one-seal unified management and one-certificate unified handling.

Figure 4:
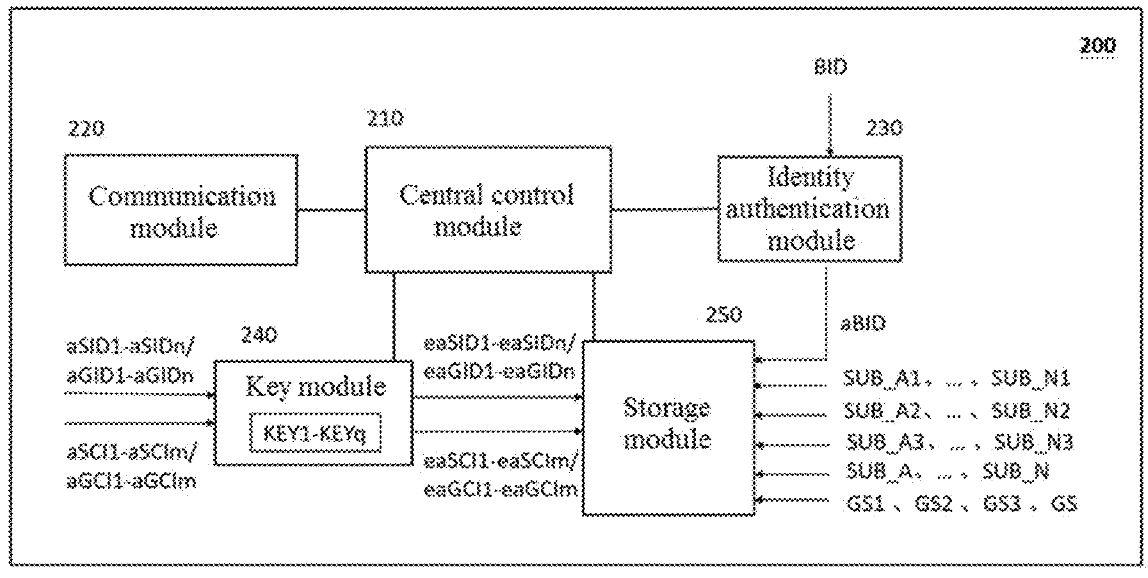
FIG. 4 is a frame diagram of a multi-module of the present invention.

With reference to FIG. 1, FIG. 2 and FIG. 4. As shown in FIG. 1 and FIG. 2, the single seal unified management and unified handling system 10/10A further includes a multi-module 200 which is coupled to the branch electronic seal generation module 140, the group electronic seal generation module 150 and the unified management and unified handling seal generation module 160. As shown in FIG. 4, the multi-module 200 includes a central control module 210, a communication module 220, an identity authentication module 230, a key module 240 and a storage module 250, in which the communication module 220, the identity authentication module 230, the key module 240 and the storage module 250 are connected to the central control module 200. The communication module 220 is configured to implement communication between the single seal unified management and unified handling system 10/10A and an external server. The identity authentication module 230 is configured to authenticate biometric data BID inputted by the multiple branch users and/or group user to generate authenticated biometric data aBID, and authorize the multiple branch users and/or group user after authentication. The key module 240 is configured to store multiple keys KEY1-KEYq, and encrypt the multiple authenticated first identity information aSID1-aSIDn, the multiple authenticated branch corporate information aSCI1-aSCIm, the multiple authenticated second identity information aGID1-aGIDn and the multiple authenticated group corporate information aGCI1-aGCIm according to corresponding keys in the multiple keys KEY1-KEYq, so as to generate multiple encrypted authenticated first identity information eaSID1-aSIDn, multiple encrypted authenticated branch corporate information eaSCI1-eaSCIm, multiple encrypted authenticated second identity information eaGID1-eaGIDn and multiple encrypted authenticated group corporate information eaGCI1-eaGCIm. The storage module 250 is configured to store the authenticated biometric data aBID, the multiple encrypted authenticated first identity information eaSID1-aSIDn, the multiple encrypted authenticated branch corporate information eaSCI1-eaSCIm, the multiple encrypted authenticated second identity information eaGID1-eaGIDn, the multiple encrypted authenticated group corporate information eaGCI1-eaGCIm, the multiple branch electronic personal seals SUB_A1, SUB_B1 . . . SUB_N1, the multiple branch electronic common seals SUB_A2, SUB_B2 . . . SUB_N2, the multiple branch business seals SUB_A3, SUB_B3 . . . SUB_N3, the multiple branch unified management and unified handling seals SUB_A, SUB_B . . . SUB_N, the group electronic personal seal GS1, the group electronic common seal GS2, the multiple group business seals GS3 and the group unified management and unified handling seal GS. The central control module 210 is configured to receive input and control operation of other modules 220-250, and allow the multiple branch users and/or the group user to call the multiple branch electronic personal seals SUB_A1, SUB_B1 . . . SUB_N1, the multiple branch electronic common seals SUB_A2, SUB_B2 . . . SUB_N2, the multiple branch business seals SUB_A3, SUB_B3 . . . SUB_N3, the multiple branch unified management and unified handling seals SUB_A, SUB_B . . . SUB_N, the group electronic personal seal GS1, the group electronic common seal GS2, the group business seals GS3 and the group unified management and unified handling seal GS after the multiple branch users and/or the group user are authorized.

Further, the communication module 220 can include at least one of a 3G communication module, a 4G communication module, a 5G communication module, a WIFI module, an NBIoT module, a Bluetooth module, an NFC module and an infrared module; and the communication module 220 supports IPV4 and IPV6 protocols.

It is to be noted that the multiple branch corporate information SCI 1-SCIms can include a bound telephone number, and a bound bank account, an electronic business license, tax control information, a common seal number, a legal person certificate number, a unified social credit code and/or an electronic license number of the multiple branch users authorized by a bank system and/or government system; and the multiple group corporate information GCI1-GCIm can include a bound telephone number, and a bound bank account, an electronic business license, tax control information, an common seal number, a legal person certificate number, a unified social credit code and/or an electronic license number of the group user authorized by a bank system and/or government system, but the present invention is not limited to this.

It is also to be noted that the biometric data can include fingerprint information data, palm print information data, iris information data and/or facial feature identification data, or any biological feature data capable of identifying the user. In practical application, one or a combination of more of the above data can be adopted for security identification.

The single seal unified management and unified handling system according to the present invention can be a trusted authentication server system or a third-party authentication platform system, and the system includes authentication, storage, management and application of various certificate keys such as an electronic seal, and it corresponds to any department or platform system of social and economic transactions, including government, corporates, individuals and families.

The single seal unified management and unified handling system according to the present invention can be implemented by a chip of a material and electricity integrated intelligent electronic seal, the chip of the material and electricity integrated intelligent electronic seal stores various certificates and keys, and all the certificates and keys can be remotely distributed, downloaded, stored and applied.

Figure 5:
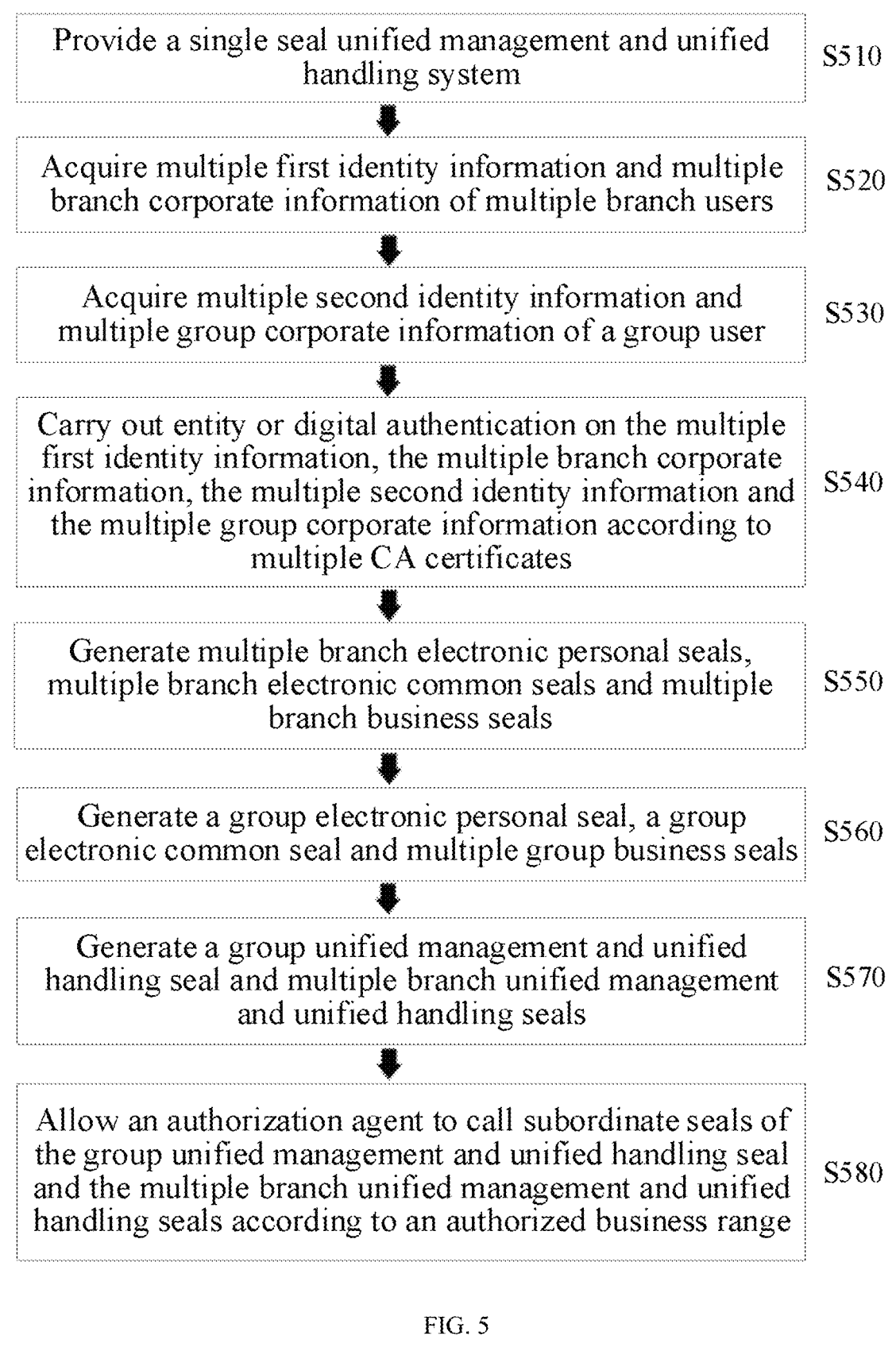

With reference to FIG. 1 and FIG. 5, FIG. 5 is a flowchart of a single seal unified management and unified handling method in an embodiment 1 of the present invention. The single seal unified management and unified handling method in FIG. 5 includes the following steps:

step S510: providing a single seal unified management and unified handling system which includes multiple branch information acquisition modules, a group information acquisition module, an information authentication module, a branch electronic seal generation module, a group electronic seal generation module, an unified management and unified handling seal generation module and an authorization module;

step S520: acquiring multiple first identity information and multiple branch corporate information of multiple branch users through the multiple branch information acquisition modules;

step S530: acquiring multiple second identity information and multiple group corporate information of a group user through the group information acquisition module;

step S540: carrying out entity or digital authentication on the multiple first identity information, the multiple branch corporate information, the multiple second identity information and the multiple group corporate information through the information authentication module, so as to generate multiple authenticated first identity information and multiple authenticated branch corporate information of the multiple branch users and generate multiple authenticated second identity information and multiple authenticated group corporate information of the group user;

step S550: generating multiple branch electronic personal seals according to the multiple authenticated first identity information through the branch electronic seal generation module, and generating multiple branch electronic common seals and multiple branch business seals of the multiple branch users according to the multiple authenticated first identity information and the multiple authenticated branch corporate information;

step S560: generating a group electronic personal seal according to the multiple authenticated second identity information through the group electronic seal generation module, and generating a group electronic common seal and multiple group business seals of the group user according to the multiple authenticated second identity information and the multiple authenticated group corporate information;

step S570: binding the group electronic personal seal, the group electronic common seal and the multiple group business seals of the group user, and the multiple branch electronic personal seals, the multiple branch electronic common seals and the multiple branch business seals of the multiple branch users through the unified management and unified handling seal generation module, so as to generate a group unified management and unified handling seal and multiple branch unified management and unified handling seals; and step S580: allowing an authorization agent to call at least one of the group electronic personal seal, the group electronic common seal, the multiple group business seals, the multiple branch electronic personal seals, the multiple branch electronic common seals and the multiple branch business seals through the authorization module when calling at least one of the group unified management and unified handling seal and the multiple branch unified management and unified handling seals according to an authorized business range.

It is to be noted that step S520 is performed through the branch information acquisition modules 110; step S530 is performed through the group information acquisition module 120; step S540 is performed through the information authentication module 130; step S550 is performed through the branch electronic seal generation module 140; step S560 is performed through the group electronic seal generation module 150; step S570 is performed through the unified management and unified handling seal generation module 160; and step S580 is performed through the authorization module 170.

With reference to FIG. 4 and FIG. 6, FIG. 6 is a flowchart of a single seal unified management and unified handling method in an embodiment 2 of the present invention. Except the steps in FIG. 5, the corporate account code management method according to the present invention further include the following steps:

step S610: providing a central control module, a communication module, an identity authentication module, a key module and a storage module, in which the communication module, the identity authentication module, the key module and the storage module are connected to the central control module;

step S620: implementing communication between the single seal unified management and unified handling system and an external server through the communication module;

step S630: authenticating biometric data inputted by the multiple branch users and/or group user to generate authenticated biometric data through the identity authentication module, and authorizing the multiple branch users and/or group user after authentication;

step S640: storing multiple keys through the key module, and encrypting the multiple authenticated first identity information, the multiple authenticated branch corporate information, the multiple authenticated second identity information and the multiple authenticated group corporate information according to corresponding keys in the multiple keys, so as to generate multiple encrypted authenticated first identity information, multiple encrypted authenticated branch corporate information, multiple encrypted authenticated second identity information and multiple encrypted authenticated group corporate information;

step S650: storing the authenticated biometric data, the multiple encrypted authenticated first identity information, the multiple encrypted authenticated branch corporate information, the multiple encrypted authenticated second identity information, the multiple encrypted authenticated group corporate information, the multiple branch electronic personal seals, the multiple branch electronic common seals, the multiple branch business seals, the multiple branch unified management and unified handling seals, the group electronic personal seal, the group electronic common seal, the multiple group business seals and the group unified management and unified handling seal through the storage module; and step S660: receiving input and controlling operation of other modules through the central control module, and allowing the multiple branch users and/or group user to call the multiple branch electronic personal seals, the multiple branch electronic common seals, the multiple branch business seals, the multiple branch unified management and unified handling seals, the group electronic personal seal, the group electronic common seal, the multiple group business seals and the group unified management and unified handling seal after the multiple branch users and/or the group user are authorized.

It is to be noted that step S620 is performed through the communication module 220; step S630 is performed through the identity authentication module 230; step S640 is performed through the key module 240; step S650 is performed through the storage module 250; and step S660 is performed through the central control module 210.

The embodiment of the present invention provides the single seal unified management and unified handling system and the single seal unified management and unified handling method, all subordinate seals can be called only through single seal unified management and unified handling seal (for example: branch unified management and unified handling seals SUB_A, SUB_B . . . SUB_N or group unified management and unified handling seal GS), thereby achieving real digital certificate-union credit seal grid management of one-seal unified management and one-certificate unified handling, and it is safe, convenient and more reliable for the users.

The embodiments of the present invention can be implemented in various hardware, software codes or a combination thereof. For example, the embodiment of the present invention can also be that the program cods of the above method is executed in a Digital Signal Processor (DSP). The present invention may also relate to various functions executed by a computer processor, the DSP, a microprocessor or a Field Programmable Gate Array (FPGA). The processor can be configured according to the present invention to execute a specific task, which can be implemented by executing a machine-readable software code or a firmware code defining the specific method disclosed by the present invention. The software code or the firmware code can be developed into different program languages and different formats or forms. The software code can also be compiled for different target platforms. However, different code styles, types and languages of the software code that performs the task according to the present invention and other types of configuration codes do not deviate from the spirit and scope of the present invention.

According to the single seal unified management and unified handling system of the present invention, certificates and keys are stored in the chip of the material and electricity integrated intelligent electronic seal instead of being stored in a public platform, so that the privacy is high and the security is high. All information is stored in the form of electronic keys and then is called and used according to actual demands, so that the security of the certificates and the keys is greatly improved.

By virtue of the technical solution, the present invention has the following beneficial effects: compared with the prior art, in the single seal unified management and unified handling system and the single seal unified management and unified handling method provided by the present invention, all subordinate seals can be called only through single seal unified management and unified handling seal, so that real digital certificate-union credit seal grid management of one-seal unified management and one-certificate unified handling is achieved, and it is safe, convenient and more reliable for the users. Then, after the elements are intensive, it can realize integrated credit reports such as one-click accounting, one-click assessment, one-click tax declaration, one-click statistics, one-click audit, one-click cancellation, one-click financing, and one-click listing. In addition, the present invention is not only suitable for multi-level units of groups and multiple branches, but also suitable for administrative units with different levels.

In the present invention, the principle and embodiment of the present invention have been elaborated by applying specific embodiments, and the description of the above embodiments is only used for helping understand the method of the present invention and its core idea; moreover, for those skilled in the art, according to the idea of the present invention, there will be changes in the specific embodiment and the scope of application, and in summary, the contents of the specification should not be understood as a restriction on the present invention.

The invention claimed is:

1. A single seal unified management and unified handling method, applying a single seal unified management and unified handling system, and comprising the following steps:

providing the single seal unified management and unified handling system, wherein the single seal unified management and unified handling system comprises multiple branch information acquisition modules, a group information acquisition module, an information authentication module, a branch electronic seal generation module, a group electronic seal generation module, a unified management and unified handling seal generation module and an authorization module;

acquiring multiple first identity information and multiple branch corporate information of multiple branch users through the multiple branch information acquisition modules;

acquiring multiple second identity information and multiple group corporate information of a group user through the group information acquisition module;

carrying out entity or digital authentication on the multiple first identity information, the multiple branch corporate information, the multiple second identity information and the multiple group corporate information through the information authentication module so as to generate multiple authenticated first identity information and multiple authenticated branch corporate information of the multiple branch users and generate multiple authenticated second identity information and multiple authenticated group corporate information of the group user;

generating multiple branch electronic personal seals according to the multiple authenticated first identity information through the branch electronic seal generation module, and generating multiple branch electronic common seals and multiple branch business seals of the multiple branch users according to the multiple authenticated first identity information and the multiple authenticated branch corporate information;

generating a group electronic personal seal according to the multiple authenticated second identity information through the group electronic seal generation module, and generating a group electronic common seal and multiple group business seals of the group user according to the multiple authenticated second identity information and the multiple authenticated group corporate information;

binding the group electronic personal seal, the group electronic common seal and the multiple group business seals of the group user, and the multiple branch electronic personal seals, the multiple branch electronic common seals and the multiple branch business seals of the multiple branch users through the unified management and unified handling seal generation module, so as to generate a group unified management and unified handling seal and multiple branch unified management and unified handling seals; and allowing an authorization agent to call at least one of the group electronic personal seal, the group electronic common seal, the multiple group business seals, the multiple branch electronic personal seals, the multiple branch electronic common seals and the multiple branch business seals through the authorization module when calling at least one of the group unified management and unified handling seal and the multiple branch unified management and unified handling seals according to an authorized business range.

2. The unified management and unified handling method of the individual seal according to claim 1, wherein the multiple branch unified management and unified handling seals are bound with the branch electronic personal seals, the branch electronic common seal and the multiple branch business seals of respective branch users respectively; and the multiple branch unified management and unified handling seals have the authority of calling the branch electronic personal seals, the branch electronic common seals and the multiple branch business seals of respective branch users.

3. The unified management and unified handling method of the individual seal according to claim 1, further comprising:

providing a central control module, a communication module, an identity authentication module, a key module and a storage module, wherein the communication module, the identity authentication module, the key module and the storage module are connected to the central control module;

implementing communication between the single seal unified management and unified handling system and an external server through the communication module;

authenticating biometric data inputted by the multiple branch users and/or group user to generate authenticated biometric data through the identity authentication module, and authorizing the multiple branch users and/or group user after authentication;

storing multiple keys through the key module, and encrypting the multiple authenticated first identity information, the multiple authenticated branch corporate information, the multiple authenticated second identity information and the multiple authenticated group corporate information according to corresponding keys in the multiple keys, so as to generate multiple encrypted authenticated first identity information, multiple encrypted authenticated branch corporate information, multiple encrypted authenticated second identity information and multiple encrypted authenticated group corporate information;

storing the authenticated biometric data, the multiple encrypted authenticated first identity information, the multiple encrypted authenticated branch corporate information, the multiple encrypted authenticated second identity information, the multiple encrypted authenticated group corporate information, the multiple branch electronic personal seals, the multiple branch electronic common seals, the multiple branch business seals, the multiple branch unified management and unified handling seals, the group electronic personal seal, the group electronic common seal, the multiple group business seals and the group unified management and unified handling seal through the storage module; and receiving input and controlling operation of other modules through the central control module, and allowing the multiple branch users and/or the group user to call the multiple branch electronic personal seals, the multiple branch electronic common seals, the multiple branch business seals, the multiple branch unified management and unified handling seals, the group electronic personal seal, the group electronic common seal, the group business seal and the group unified management and unified handling seal after the multiple branch users and/or the group user are authorized.

4. The unified management and unified handling method of the individual seal according to claim 2, wherein the group unified management and unified handling seal is bound with the group electronic personal seal, the group electronic common seal, the multiple group business seals, the multiple branch electronic personal seals, the multiple branch electronic common seals, the multiple branch business seals and the multiple branch unified management and unified handling seals; and the group unified management and unified handling seal has the authority of calling the group electronic personal seal, the group electronic common seal, the multiple group business seals, the multiple branch electronic personal seals, the multiple branch electronic common seals, the multiple branch business seals and the multiple branch unified management and unified handling seals.

* * * * *